United States Patent
Doukhvalov et al.

(10) Patent No.: US 10,867,051 B2
(45) Date of Patent: Dec. 15, 2020

(54) SYSTEM AND METHOD OF AUTOMATED DESIGN OF HARDWARE AND SOFTWARE SYSTEMS AND COMPLEXES

(71) Applicant: AO Kaspersky Lab, Moscow (RU)

(72) Inventors: Andrey P. Doukhvalov, Moscow (RU); Ekaterina A. Rudina, Moscow (RU); Semen S. Kort, Moscow (RU); Viacheslav N. Zolotnikov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 358 days.

(21) Appl. No.: 15/948,397

(22) Filed: Apr. 9, 2018

(65) Prior Publication Data

US 2019/0102561 A1  Apr. 4, 2019

Related U.S. Application Data

(60) Provisional application No. 62/573,754, filed on Oct. 18, 2017.

(30) Foreign Application Priority Data

Sep. 29, 2017 (RU) ................................ 2017133843

(51) Int. Cl.
| | | |
|---|---|---|
| G06F 7/04 | (2006.01) | |
| G06F 21/57 | (2013.01) | |
| G06F 30/20 | (2020.01) | |
| G06F 30/30 | (2020.01) | |
| G06F 117/08 | (2020.01) | |

(52) U.S. Cl.
CPC ............ G06F 21/577 (2013.01); G06F 30/20 (2020.01); G06F 30/30 (2020.01); *G06F 2117/08* (2020.01); *G06F 2221/034* (2013.01)

(58) Field of Classification Search
CPC .. G06F 21/577; G06F 30/20; G06F 2221/034; H04L 63/1433; H04L 63/1441
See application file for complete search history.

(56) References Cited

U.S. PATENT DOCUMENTS

| | | | |
|---|---|---|---|
| 8,762,188 B2 | 6/2014 | Abercrombie et al. | |
| 2011/0224954 A1* | 9/2011 | Jayasundara | ........... G06F 30/20 703/1 |
| 2014/0090071 A1 | 3/2014 | Salehie et al. | |
| 2017/0091462 A1* | 3/2017 | Kurauchi | .............. G06F 16/245 |
| 2018/0337939 A1* | 11/2018 | Agarwal | ................ H04L 63/20 |

FOREIGN PATENT DOCUMENTS

EP    1669912 A1   6/2006

* cited by examiner

*Primary Examiner* — Trong H Nguyen
(74) *Attorney, Agent, or Firm* — Arent Fox LLP; Michael Fainberg

(57) ABSTRACT

The present disclosure is directed to methods and systems for automated design of a system of hardware and software. In an exemplary embodiment, such a method comprises constructing, by a hardware processor, a model of use based on an architecture description of the system, constructing, by the hardware processor, threat model based on a threat description indicating known threats to the system, determining use of the system based on a comparison between the model of use and the threat model and selecting a configuration for realizing the system based on a result of the comparison.

20 Claims, 9 Drawing Sheets

SYSTEM AND METHOD OF AUTOMATED DESIGN OF HARDWARE AND SOFTWARE SYSTEMS AND COMPLEXES

CROSS-REFERENCE TO RELATED APPLICATIONS

This application claims benefit of priority under 35 U.S.C. 119(a)-(d) to a Russian Patent Application No. 2017133843 filed on Sep. 29, 2017, and the benefit of priority under 35 U.S.C. 119(e) to U.S. Provisional Application No. 62,573,754 filed Oct. 18, 2017, which is incorporated by reference in its entirety herein.

FIELD OF TECHNOLOGY

The disclosure relates generally to computer system design, and more particularly to methods and systems of automated design of hardware and software systems and complexes.

BACKGROUND

When designing hardware and software systems and complexes, their architecture is based on achieving one or more stated goals. The goals are formulated by parties (stakeholders) who have an interest or concern in the system. The interests of the interested parties are expressed as a use or a problem. Examples of interests with respect to a system in accordance with the mentioned standard are: functionality, feasibility, applicability, system characteristics, system attributes, known limitations, structure, behavior, functioning, resource utilization, reliability, functional safety, data integrity, guaranteed availability on demand, and so forth.

In the design process, only authorized users are considered as interested parties. Interested parties are rights holders or, users (groups, organizations), who are permitted to perform a certain operation in the system to realize an interest, or whose interest needs to be considered according to the requirement of a standard (such as a standard setting forth requirements on functional safety). In the end, a system is created which meets the requirements of the authorized users and the requirements of functional safety. But in order to ensure the information security of the created system afterwards, additional elements may be used, which often are not originally provided by the architecture which has a significant impact, during use of the system, on the realization of the interests of the authorized users and the observance of the requirements of functional safety. Likewise, the information security may be ensured by additional elements which are provided by the architecture, yet without considering the interests of the authorized users and the requirements of functional safety. Failing to consider the requirements of functional safety may also affect the realization of the interests of the authorized users and the observance of the requirements of information security during use.

Thus, the technical problem is that the system architecture provides for the achievement of the goals stated by the authorized users and the observance of the requirements of functional safety, but does not provide for information security.

SUMMARY

Disclosed herein are systems and method of automated design of hardware and software systems and complexes. The technical result of the present disclosure is to ensure the selection of software and hardware in the process of automated design of a system of software and hardware, the use of which ensures the achievement of the goals of information security while considering the interests of the authorized users and the requirements of functional safety. The technical result is achieved by the design of the system with the use of a model of threats and its comparison to a model of use.

A model of threats contains current threats to the system being designed (reflects the interests of hackers) and consequently these threats must not be realized in order to achieve the goals of information security. A model of use contains the current possibilities of authorized use (reflects the interests of the authorized users and the requirements of functional safety), and consequently they must be realized by the system being designed The subject matter of the present disclosure according to one embodiment is a method of design of a system of hardware and software by an automated design system, in which CAD modules receive as their input a formalized description of the architecture of the system being designed (hereinafter, the system). On the basis of the description, a model of use is constructed, including: the kind of use of the system reflecting the interest of an authorized user; the element of the system (hereinafter, element) by which said use is realized; the method of realization of said kind of use through said element. The CAD modules likewise receive from a threat database a formalized description of known threats to systems similar to the one being designed and on the basis of the formalized description of the known threats.

A threat model is similar to the model of use, and includes: the kind of threat, where the threat is unauthorized use of the system reflecting the interest of a violator; the element by which the given kind of threat is realized; the method of realization of the threat by said element; the vector of action on the system to carry out the method of realization of the threat. After the model of use and the threat model are constructed, the threat model is compared to the use model by a method of comparison designed to compare models of the given kind, in order to determine the kinds of use of the system, reflecting:

only the interest of a violator;
the interest of both a violator and an authorized user, yet realized by each of the interested parties in different ways;
the interest of both a violator and an authorized user and realized in similar ways.

On the basis of the comparison, the element selection module selects hardware and software for the realization of the system elements so that the functional capabilities or methods of configuration of such means at least:

limit the kinds of use of the system when the given kind of use reflects only the interests of a violator;
limit the method of realization of a threat, when the given kind of use of the system reflects the interests of both a violator and an authorized user, yet is realized by each of the interested parties in different ways;
limit the vector of action on the system being used to carry out the method of realization of a threat when the given kind of use of the system reflects the interest of both a violator and an authorized user and is realized in similar ways.

In a particular case, the CAD receives at its input a formalized architecture description, which contains at least: system elements, including system components and the links between components; the interests of authorized users with respect to the system.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
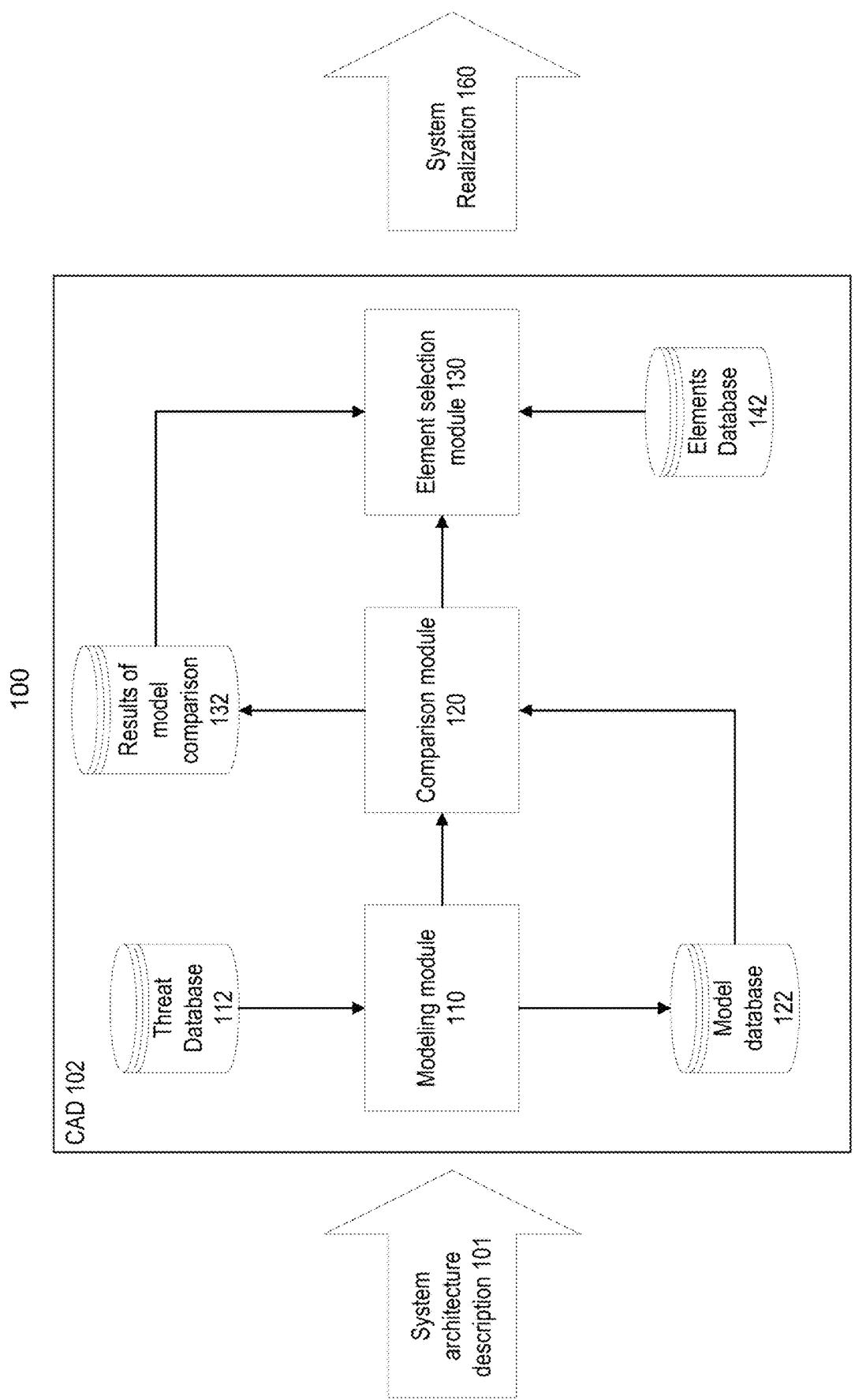
FIG. 1 illustrates a block diagram a system for automated design of hardware and software systems and complexes in accordance with an exemplary aspect of the present disclosure.

Exemplary aspects are described herein in the context of a system, method, and computer program product of automated design of hardware and software systems and complexes. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The following terms will be used throught the disclosure, drawings and claims.

An architecture description is a work product used to express an architecture of a system. In a particular case, it is formalized by a UML (Unified Modeling Language). In accordance with ISO/IEC/IEEE 42010, the architecture description contains many applications on the part of various interested parties for the entire life cycle of the system. The formalized architecture description is also used as input to an automated tool kit for modeling, system simulation and analysis, such as a computer-aided designer (CAD).

The architecture of a system is the fundamental concepts or attributes of the system in an environment, embodied by its elements, relations, and specific principles of design and development. In the present disclosure, system elements refer to at least the system components and the links between components. These elements may be realized by hardware and/or software. Variant realizations of the hardware and software are determined in the course of the design of the system.

The interest (also referred to as concern) of a system is a usage or problems in the system pertaining to one or more interested parties, according to an embodiment of the present disclosure.

Interested parties (i.e., stakeholders) are one or more of an individual, a team, an organization, or groups of these, having an interest in the system.

Authorized users are interested parties interested parties who are permitted to perform a certain operation in the system (alternatively, "use" the system) to realize an interest.

A model of use is a formalized description of variant uses of a system by authorized users. In one embodiment, the model of use may include at least:
  the kind of use of the system reflecting the interest of the authorized user;
  the system element (hereinafter, element) through which the use is realized;
  the method of realization of the given kind of use by said element;

A violator (alternatively, unauthorized user), in one embodiment, may be one of the interested parties not having a right to perform a certain operation in the system to realize his interest.

A threat, in one embodiment, may be a potential event which may violate the proper functioning of the system and thereby directly or indirectly inflict damage. The kinds of threats are very diversified and have many classifications; in the context of the present application, classifications according to the nature of the threat are used, for example:
  violation of confidentiality of data;
  violation of data integrity/substitution of data;
  violation of system operability (incl. denial of service);
  unauthorized intervention in system functioning;
  and so forth.

A threat model is a formalized description of threats to information security in regard to a system. According to one embodiment, the threat model may include at least:
  the kind of threat, where the threat is unauthorized use of a system reflecting the interest of a violator;
  the element by which the given kind of threat is realized;
  the method of realization of the threat by said element;
  the vector of action on the system to carry out the method of realization of the threat (the attack vector);

The method of realization of a threat, or the attack, is the actions of a violator in the realization of a threat to security of a particular kind. For each element of the system, a particular kind of threat may be realized in different ways, including the involvement of other system components.

The attack vector is a direction or specific way of acting on a system by a violator in the realization of a threat to security. In the context of the present application, the attribute "attack vector" is identical to the attribute "vector of action on the system to carry out the method of realization of the threat". The characteristics defining an attack vector may be at least:

the source or the group of sources of the attack;
the element or group of elements which are the target of the attack;
the kind of action;
how the action is performed.

The threat model and the use model may, in some embodiments, not differ from each other in any way (except for the attack vector) for an identical system or complex. A classifying attribute making it possible to distinguish one model from another is the fact that a use model reflects the interest of an authorized user, while the threat model reflects the interest of a violator. Examples of models for actual systems will be given below.

In the present disclosure, the technical problem pointed out in the prior art is solved by the design of a system with the use of a threat model as contrasted with a use model. Thus, the interested parties are considered to be not only the authorized users, but also the violators. The interests of the authorized users are contrasted with the interests of the violators, where the system architecture must afford the realization of the interests of the authorized users and limit the realization of the interests of the violators.

The design of hardware and software systems and complexes is done by an automated design system (hereinafter, CAD 102), a variant realization of which is shown in FIG. 1. The system 100 shown in FIG. 1 comprises a CAD 102 which takes, as input a formalized architecture description 101 of the system being designed, including at least: the system elements, including system components and the links between components; the interests of the authorized users with regard to the system. The CAD 102 outputs the system realization 160 comprising the hardware and software elements for the realization of the elements of the system being designed. The CAD 102 includes the following modules:

Modeling module 110;
Comparison module 120;
Element selection module 130.
The CAD 102 has at its disposal databases containing:
information on threats (hereinafter, the threat database 112);
threat models and use models (hereinafter, the model database 122);
results of the comparison of models (hereinafter, the result database 132);
variant hardware and software realizations of the elements of systems and complexes (hereinafter, the elements database 142).

In a particular case, hardware belonging to the class that is resistant to physical action, hacking, and falsification (tamper resistance) is also selected for the realization of the system elements.

A threat database 112 is a database containing formalized information about threats. A threat is described by enumerating its principal characteristics. For example:

Threat type. System element. Method of threat realization: attack vector.

The threat database 112 is constantly updated, including by information security specialists and analysts, as they discover new kinds of threats, methods of their realization, and previously unknown attack vectors; the list of system elements vulnerable to a particular kind of threat is also expanded. The same kind of threat (unauthorized control, unauthorized access to information, denial of service, etc.) will pertain to the system as a whole and may be realized in regard to different components and other elements of the system, compromising both individual elements of the system and the system as a whole. For different system elements, the threat descriptions may be repeated, but the attacks, the influence on the system, the risks related to the threats and the counteracting of these threats may be different. For each element, a defined kind of threat may be realized in different ways, including the involvement of other system components. For example, to produce a denial of service for a camera of a CCTV system (in the threat description the camera is the system element) having access to the Internet via a web server, it is first necessary to compromise the web server (see FIG. 2b WEB_VULN).

The model database 122 is a database which contains constructed models of use and threat models. This database is filled both in the course of modeling carried out directly by the modeling module of the CAD and also from the outside, when already constructed models are loaded into the database. The modeling module 110 converts the models into a form used for further comparison. The models of use and the threat models have an identical form. For example, for the description of the threat given above, one uses tree models where the characteristics are the nodes of the tree.

Figure 2A:
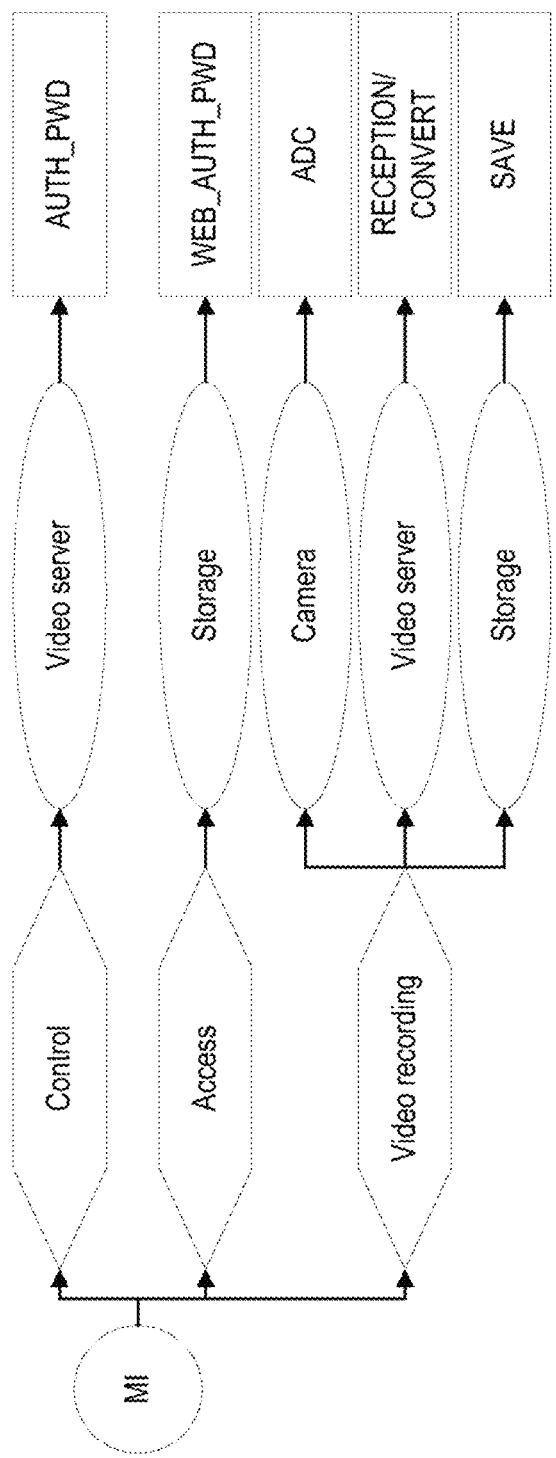
FIGS. 2a-b illustrate a model of use and a threat model for a CCTV system being designed in accordance with an exemplary aspect of the present disclosure.
Figure 3:
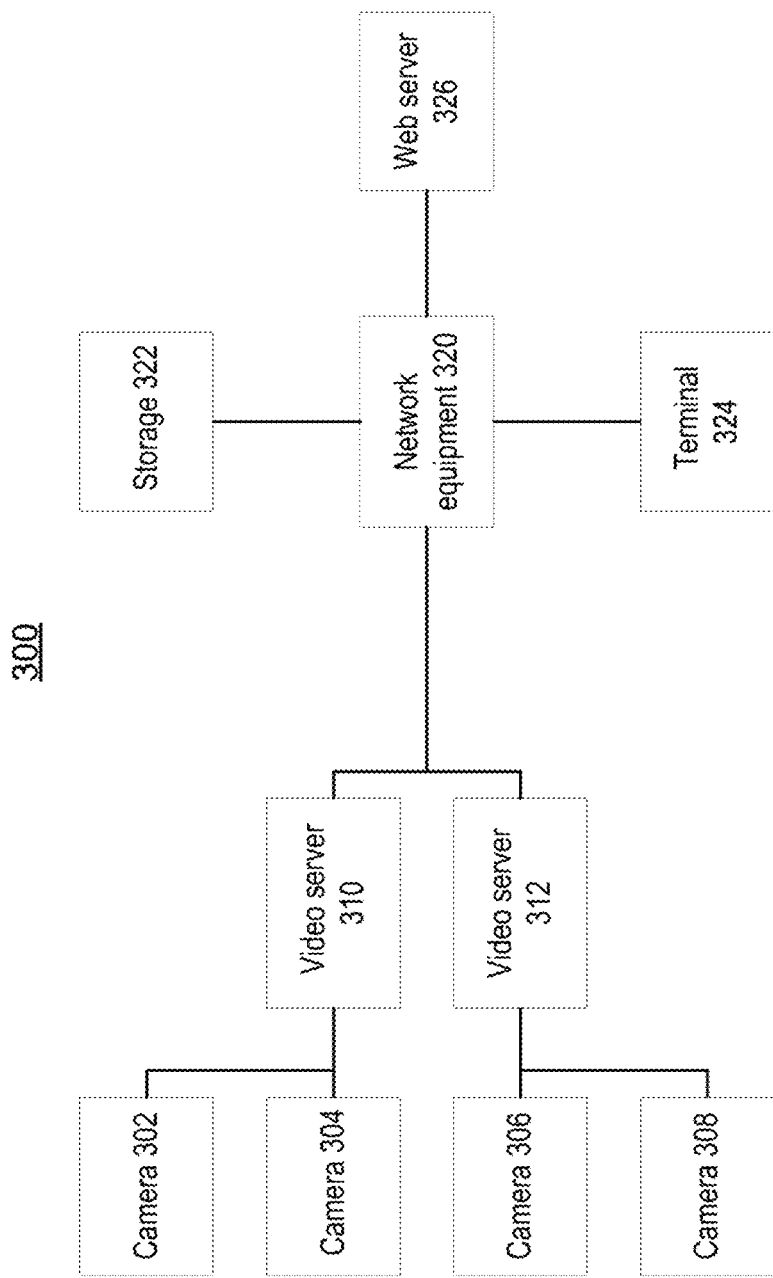
FIG. 3 illustrates a diagram of the CCTV system being designed in accordance with an exemplary aspect of the present disclosure.

FIG. 3 shows a diagram of a CCTV system 300 being designed, where the CCTV cameras 302-308 are connected to video servers 310 and 312 enabling the receiving, dispatching, and storing of the video streams from these cameras. Storage 322 is used for storing the video streams from the cameras 302-308. Access to the video streams from the storage 322 by authorized users is possible both from inside the system 300 via terminals 324 and from outside the system 300, via video server 310 or 312. Access to the video server 310 or 312 for control of the system 300 is possible via the terminal 324. The system components are linked by network equipment 320. Thus, the model of use includes the following kinds of use (as reflected in the model, FIG. 2a):

control of the system 300, realized via video server 310 or 312 from terminal 324 by authentication on the video server 310 or 312;
access to the video streams contained in the storage 322, realized through the storage, by authentication on the web server 326;
video recording, realized by:
camera, via analog-digital conversion of the optical signal (video stream) by the camera (ADC, in FIG. 2a ADC);
video server, by reception and processing of the converted signal (in FIG. 2a RECEPTION/CONVERT);
storage, by saving the received and processed signal (in FIG. 2a SAVE).

Figure 2B:
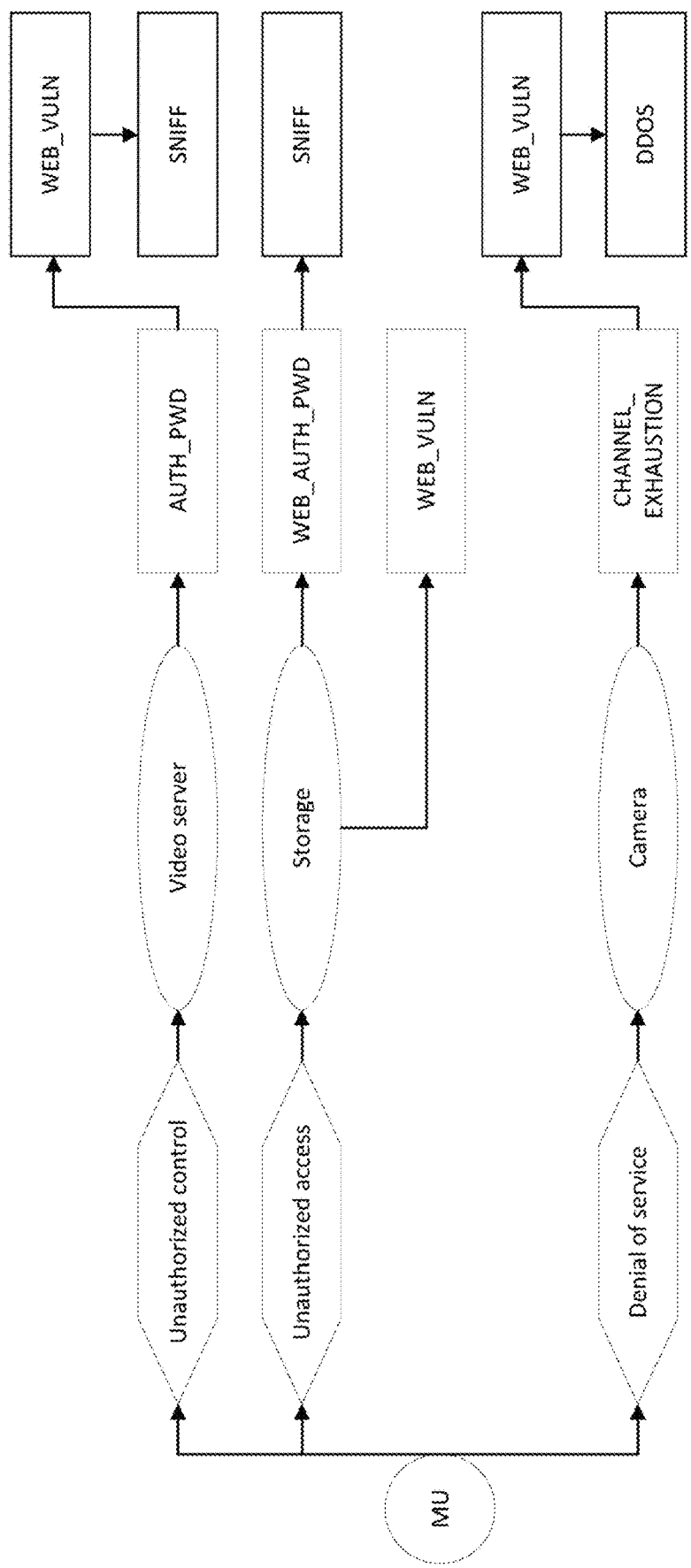

FIGS. 2a-b show simplified examples intended to assist the skilled person in a thorough understanding of the disclosure. FIG. 2a illustrates a model of use in accordance with exemplary embodiments of the present disclosure. FIG. 2b illustrates a threat model in accordance with exemplary embodiments of the present disclosure, for the system being designed, depicted in FIG. 3. The threat model for this system will be discussed when discussing the modeling module 110.

The results of model comparison database 132 contains the results of a comparison of a model of use with a threat model. The form of the result contained in the database depends on the kind of model and the method of comparison. For example, for tree models, the model will be formed using nodes and branches, for example as illustrated in FIG. 4. FIG. 5 presents an example of a comparison result (performed by the intersection method) of the models presented in FIG. 2a and FIG. 2b, likewise constituting a tree model. These examples shall be discussed when describing the comparison module 120 and the element selection module 130.

The elements database 142 contains a description of the software and hardware and the method of configuring the software and hardware for the selection of the realization of the elements of the systems being designed. The description includes the actual software and hardware, its configuration variants and the functional capabilities provided by the system configuration elements (e.g., software and hardware) configured in a particular manner, both individually and in combination with other system configuration elements. The description of the system configuration elements likewise contains information on which kinds of threats or attacks the elements are or are not subjected to, and how these elements can be combined with other elements to become resistant to a particular type of threat or attack.

According to one embodiment, the modeling module 110 may construct models of use and threat models on the basis of the architecture description 101 of the system being designed. In an embodiment of the present disclosure, the models are constructed in order to convert the description of threats and the description of use to the same form in order to make a comparison. The modeling module 110 constructs the model of use on the basis of the interests of the authorized users in regard to the system (in a particular case, the requirements for the system) as obtained at the input of the CAD in the formalized architecture description 101. Such interests for the system 300 being designed in the example of FIG. 3, as is understandable, are the exploitation interest assuming the following use by an authorized user: video recording; control of the video recording system 300; access to the saved video streams.

The architecture description 101 likewise indicates the elements by which the aforementioned use is realized and the methods of realization. On this basis, the modeling module 110 composes the kinds of use and constructs a model, one example of which is shown in FIG. 2a.

The modeling module 110 also constructs threat models on the basis of the interests of the violators with respect to the system. The interests of the violators are expressed as threats contained in the threat database 112. The threats are selected based on the characteristics of the system being designed (the system elements, the purposes of the elements and of the system as a whole), so that the modeling module 110 extracts from the threat database 112 known threats to systems similar to the one being designed (systems with the same purpose) and separately for the elements contained in the system being designed. The interest of the violators with respect to the system being designed, as can be understood from the example, is likewise an exploitation interest assuming the following use by the violator: unauthorized control of the video recording system; and unauthorized access to the saved video streams.

Another interest may be the placing of the system in a non-operational state, e.g., executing a denial of service attack.

In a particular case, the model database 122 or threat database 112 may already contain a modeled threat description for the system being designed. In this case the modeling module 110 rearranges that model into a form for comparison with a model of use.

The threat description (as mentioned above when describing the threat database 112) indicates the elements by which the threat is realized and the methods of realization of the threat (attack), as well as the attack vectors. On this basis, the modeling module 110 constructs a model, one example of which is shown in FIG. 2b. For the system 300 being designed from the example shown in FIG. 3, the threats are:
unauthorized control, realized through the video server 310 or 312 by:
a stolen password (AUTH_PWD) for authorization on the video server 310 or 312, where the attack vectors for this method are:
exploitation of a vulnerability of the web server 326 (WEB_VULN) to penetrate into the internal network;
followed by interception of the mentioned password within the network (SNIFF);
unauthorized access, realized through the storage 322, by means of:
a stolen password (WEB_AUTH_PWD) for authorization on the web server 326, where the attack vectors for carrying out this method are:
intercepting said password (SNIFF) by eavesdropping on the connection between an authorized user obtaining access from an external network and the web server 326;
exploitation of a vulnerability of the web server 326 (WEB_VULN);
denial of service, realized through a camera (e.g., 302-308) by means of:
channel exhaustion (CHANNEL_EXHAUSTION), where the attack vectors for this method are:
exploitation of a vulnerability of the network equipment, especially the web server 326 (WEB_VULN) for direct access to the cameras 302-308 from an external network;
followed by a distributed attack (DDOS) on one or more of the cameras 302-308 to which direct access has been obtained.

Figure 4A:
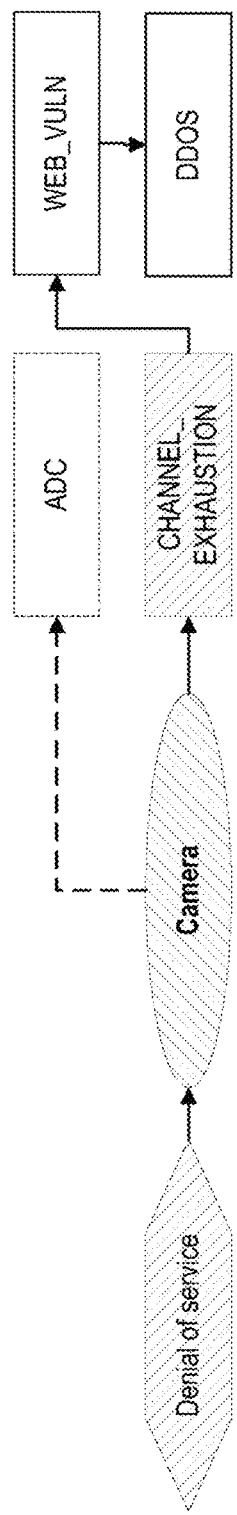
FIGS. 4a-c represents the results of a comparison of the model of use and the threat model in accordance with an exemplary aspect of the present disclosure.
Figure 4B:
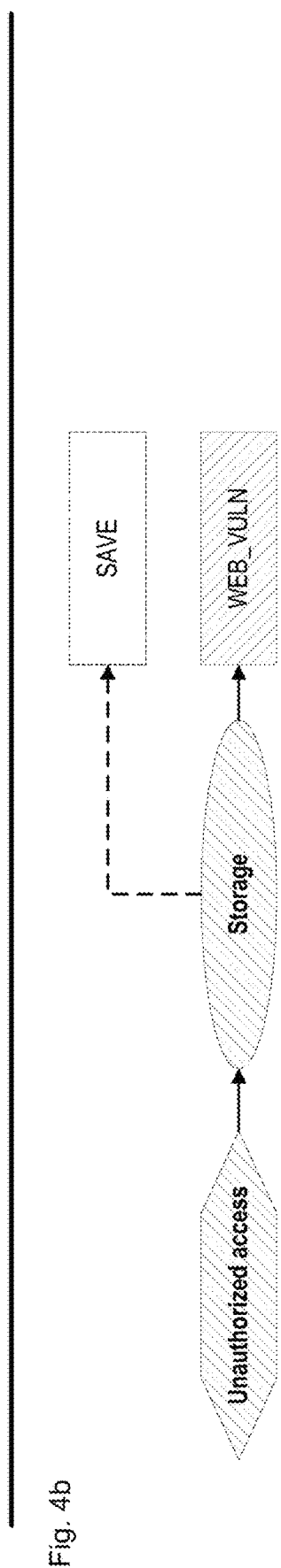
Figure 4C:
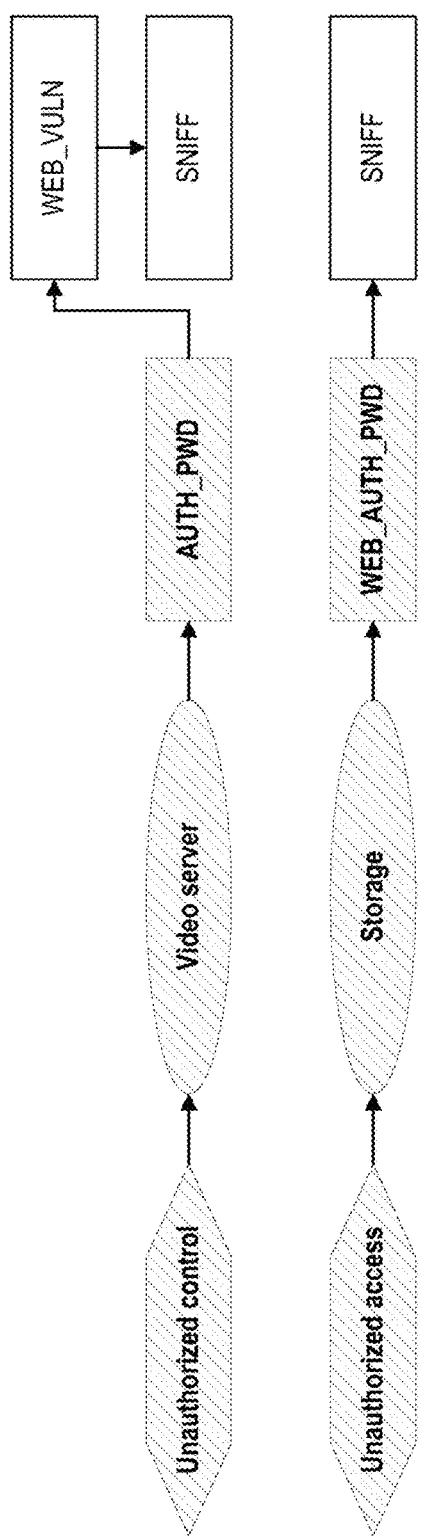
Figure 5:
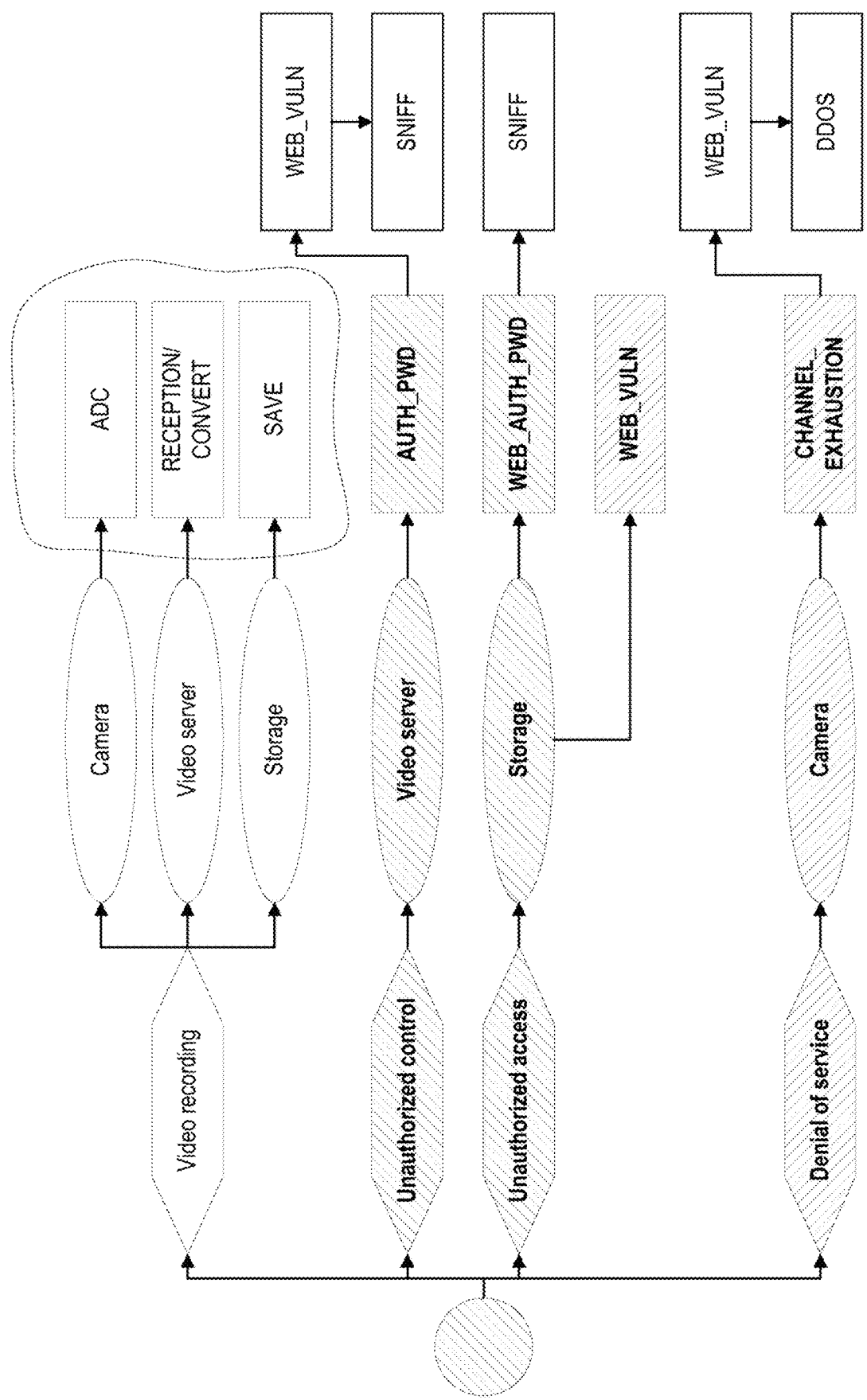
FIG. 5 represents the results of a comparison of the model of use and the threat model, expressed in the form of a model in accordance with an exemplary aspect of the present disclosure.

The comparison module 120 is designed to compare the model of use and the threat model. The method of comparison itself depends on the kind of models. For tree models, one uses an intersection, the result of which is shown in the figures, where the result of the comparison is a model (FIG. 5) or parts of models (FIGS. 4a-c) indicating:
the kinds of use of the system reflecting only the interest of the violator (FIG. 4a);
the kinds of use of the system reflecting the interest of both the violator and an authorized user, yet realized by each of the interested parties in different ways (FIG. 4b);
the kinds of use of the system reflecting the interest of both the violator and an authorized user and realized in similar ways (FIG. 4c);

The result of the comparison may contain, in one embodiment, methods of realization (requirements on the system elements) reflecting the interest of an authorized user (depicted in FIGS. 4a-c, and highlighted in FIG. 5 by dotted lines).

FIG. 4a shows the kind of use reflecting only the interest of a violator. There is no such kind of use as a denial of service in the model of use, but the denial of service is realized through the "camera" system element. Here, the camera may be used in the model of use for the realization of the interest of the authorized user, and therefore the result of the comparison is supplemented with information on the method of realization of the interest of an authorized user (in FIG. 4a this is ADC). This may be taken into account by the element selection module 130. The denial of service is realized by an attack on channel exhaustion (in FIG. 4a CHANNEL_EXHAUSTION), which is possible by exploiting a vulnerability of the network equipment 320 in FIG. 3, such as the web server 326 (in FIG. 4a WEB_VULN) for direct access to the camera from an external network, after which a distributed attack is carried out on the camera (in FIG. 4a DDOS)

FIG. 4b shows a kind of use of the system reflecting the interest of both a violator and an authorized user, yet realized by each of the interested parties in different ways. Such a kind of use as access reflects the interest of both a violator and an authorized user. Yet the method of realization of the threat differs from the method of realization of the use reflecting the interest of an authorized user. To realize the threat, a vulnerability of the web server is exploited (in FIG. 4c denoted as WEB_VULN). The storage 322 shown in FIG. 3 is used in the model of use to realize the interest of the authorized user (video recording), and therefore the result of the comparison is supplemented with information on the method of realizing the interest of the authorized user (in FIG. 4b this is SAVE), and this will be taken into account by the element selection module 130 when determining the requirements on the functional capabilities of the elements.

FIG. 4c shows the kinds of use of the system reflecting the interest of both a violator and an authorized user, and realized in similar ways. Such a kind of use as control reflects the interest of both a violator and an authorized user. This use is realized in similar ways, through authorization by means of a password on the video server (in FIG. 4c AUTH_PWD), the difference being how this password is obtained. The violator obtains this password by exploiting vulnerabilities of the web server (WEB_VULN), which lets him penetrate into the network linking the components of the CCTV system with subsequent interception of this password in the network (SNIFF). The attack vectors are denoted as WEB_VULN and SNIFF in FIG. 4c. Such a kind of use as access reflects the interest of both a violator and an authorized user and may be realized by a violator, including (and FIG. 4b shows another possible method of realization—exploitation of vulnerabilities of a web server) that in a way similar to the method of use of an authorized user by authorization with a password on the web server. The violator obtains this password by intercepting traffic (SNIFF) going to the web server from an external network of an authorized user.

The element selection module 130 is designed to select the method for realizing the system elements. The selection of the method is performed on the basis of the results of the comparison of models. The software and hardware for realization of the system elements are selected so that these elements ensure the realization of the interests of the authorized users, yet the functional capabilities or methods of configuration (including the security policy settings) of these elements at least:
  limit the kinds of use of the system when the given kind of use reflects only the interests of a violator;
  limit the method of realization of a threat, when the given kind of use of the system reflects the interests of both a violator and an authorized user, yet is realized by each of the interested parties in different ways;
  limit the vector of action on the system being used to carry out the method of realization of a threat when the given kind of use of the system reflects the interest of both a violator and an authorized user and is realized in similar ways.

Thus, for the case shown in FIG. 4a, it is necessary to limit (in a particular case, totally exclude) the kind of use (threat) reflecting the interest of a violator. However, since this kind of use is realized through the "camera" element which is used also to realize the interests of an authorized user (video recording), this also must be taken into account (in FIG. 4a ADC). By using the indicated requirements, the element selection module 130 queries the elements database 142, indicating what needs to be realized (in the present case, ADC), and what needs to be limited (in the present case, DDOS, WEB_VULN or CHANNEL_EXHAUSTION) or directly excluded (the kind of use: denial of service). In response to this query, the elements database 142 puts out possible variants; in the present example, this might be a camera of type BNC (Bayonet Neill-Concelman), which in theory is not subject to a CHANNEL_EXHAUSTION attack.

For the case shown in FIG. 4b, it is necessary to limit (in a particular case, totally exclude) the kind of realization of a threat by exploiting vulnerabilities of the web server. By using the indicated requirements, the element selection module 130 queries the elements database 142, indicating what needs to be limited in the system (in the present case, WEB_VULN). In response to the query, the elements database 142 may propose the use of patch control (patch manager) or exploit prevention, or a DMZ.

For the cases shown in FIG. 4c the vector of action is limited (and in one embodiment, totally excluded) on the system used to carry out the method of realization of the threat. To limit the attack vectors, one of the components of the attack vector which is also a characteristic thereof is blocked or its realization is rendered impossible:
  the source or the group of sources of the attack;
  the element or group of elements which are the target of the attack;
  the kind of action;
  how an action is performed.

Thus, the element selection module 130 queries the elements database 142, indicating what needs to be realized (in the present case, the connection between authorized users from an external network and the web server) and what needs to be limited (in the present case, the intercepting of a password for authorization on the web server). In response, the database 142 outputs the use of a protected connection (the using of encryption) between the authorized user and the web server, thereby limiting the attack vector. Traffic may still be intercepted, but it is not possible to extract a password from it.

Figure 6:
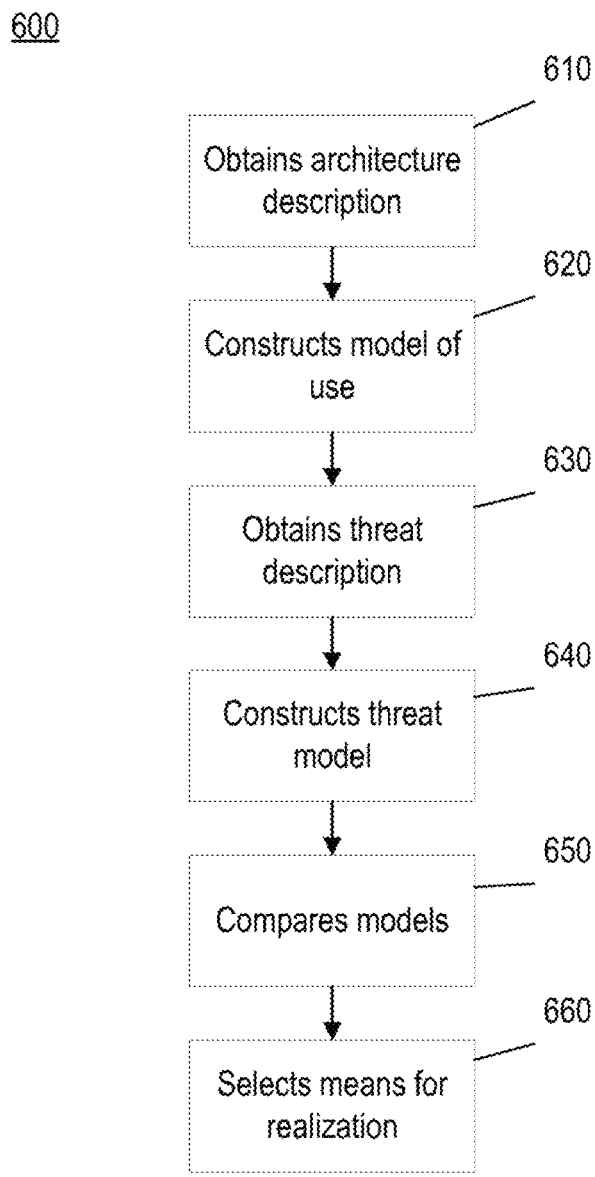
FIG. 6 is a flowchart for a method of automated design of hardware and software systems and complexes in accordance with an exemplary aspect of the present disclosure.

The system 100 represented in FIG. 1 is used to carry out the method of automated design of a system of hardware and software. This method 600 is shown in FIG. 6. In the beginning, the input of the CAD 102 in step 610 obtains a formalized architecture description of the system being designed (hereinafter, the system), including at least:
  system elements, including system components and the links between components;
  the interests of authorized users with respect to the system.

On the basis of the description obtained in step 620 the modeling module 110 constructs a model of use including:
  the kind of use of the system reflecting the interest of the authorized user;
  the system element (hereinafter, element) through which such use is realized;
  the method of realization of the given kind of use by said element.

The model constructed by the modeling module 110 is saved in the model database 122. In step 630, a formalized description is obtained from the threat database 112 of the known threats to systems similar to the one being designed and on the basis of the threat description in step 640 the modeling module 110 constructs a threat model of the same kind as the model of use, including:
- the kind of threat, where the threat is unauthorized use of a system reflecting the interest of a violator;
- the element by which the given kind of threat is realized;
- the method of realization of the threat by said element;
- the vector of action on the system to carry out the method of realization of the threat.

Next, in step 650, the comparison module 120 extracts the constructed models from the model database 122 and compares the threat model to the model of use by the method of comparison designed for comparing models of the given kind, in order to determine:
- the kinds of use of the system reflecting only the interest of the violator;
- the kinds of use of the system reflecting the interest of both the violator and an authorized user, yet realized by each of the interested parties in different ways;
- the kinds of use of the system reflecting the interest of both the violator and an authorized user and realized in similar ways;

The element selection module 130 in step 660 selects, on the basis of the comparison, the hardware and software for the realization of the system elements (making it possible to realize the interests of the authorized users) such that the functional capabilities or methods of configuration of such elements at least:
- limit the kinds of use of the system when the given kind of use reflects only the interests of a violator;
- limit the method of realization of a threat, when the given kind of use of the system reflects the interests of both a violator and an authorized user, yet is realized by each of the interested parties in different ways;
- limit the vector of action on the system being used to carry out the method of realization of a threat when the given kind of use of the system reflects the interest of both a violator and an authorized user and is realized in similar ways.

In a particular case, the functional capabilities or methods of configuration of such hardware and software for realization should ensure not only the realization of the interests of the authorized users, but also the realization of the requirements of functional safety. In certain cases, the requirements of functional safety are the interests of one of the interested parties.

Figure 7:
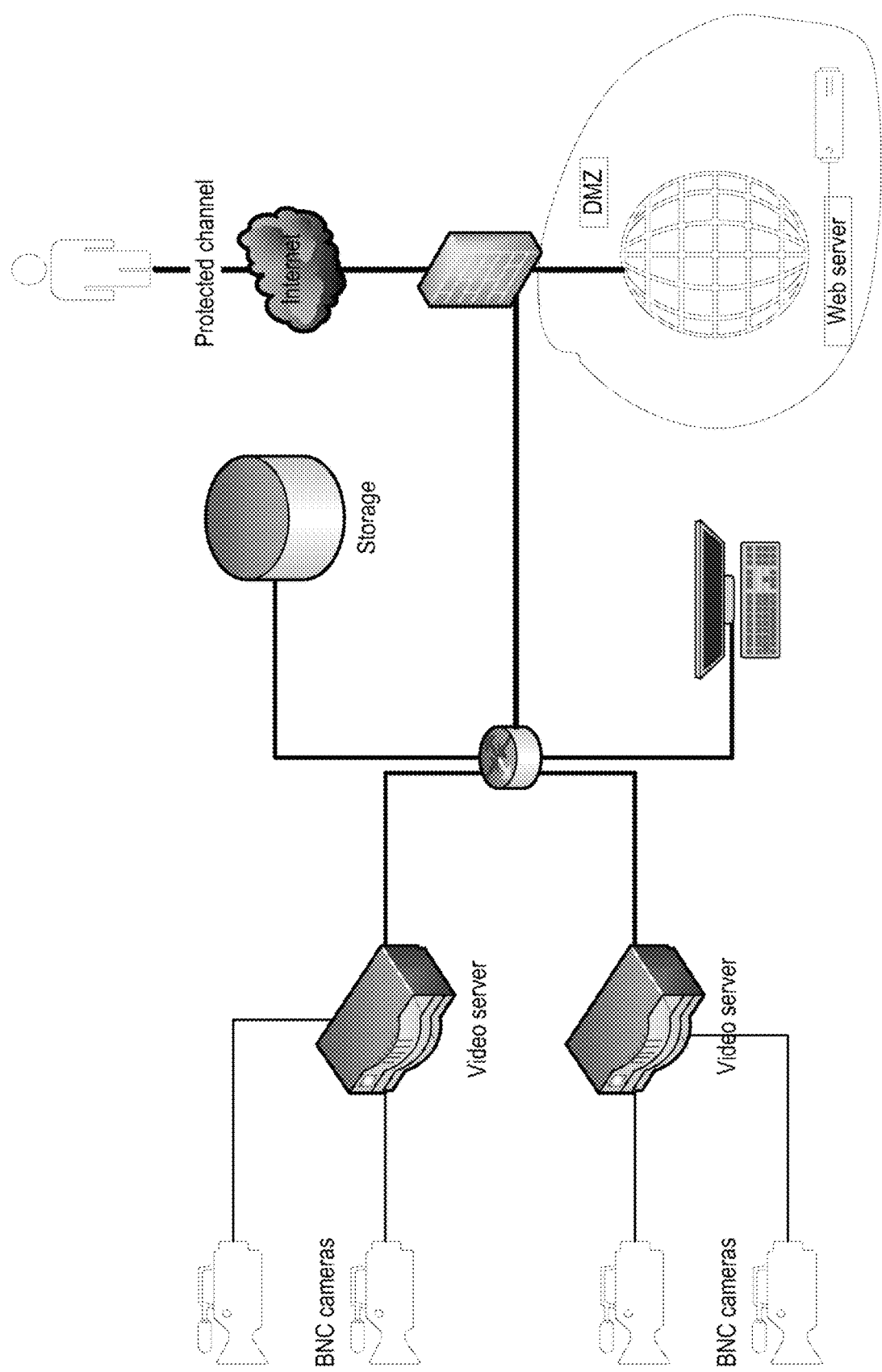
FIG. 7 illustrates a variant realization of the CCTV system being designed in accordance with an exemplary aspect of the present disclosure.

A variant realization of the elements of the system being designed from the example is shown in FIG. 7. To ensure the interests of the authorized users and not the possibility of realization of threats by violators, the key elements in the realization of the architecture are:
- BNC cameras;
- a protected channel between an authorized user and the web server;
- a DMZ zone in which the web server is situated.

In the present disclosure, by CAD modules is meant in the present disclosure actual devices, systems, components, a group of components realized with the use of hardware, such as integrated microcircuits (application-specific integrated circuits, ASICs) or field-programmable gate arrays (FPGAs) or, for example, in the form of software and hardware, such as a microprocessor system and a set of program instructions, as well as neurosynaptic chips. The functionality of the CAD modules may be realized exclusively by hardware, as well as a combination where some of the functionality is realized by software and some by hardware. In certain variant embodiments, some of the CAD modules may be implemented on the processor of a general-purpose computer (such as the one shown in FIG. 5). The databases may be realized by all possible methods and are contained either on a single physical medium or on various media, arranged either locally or remotely.

Figure 8:
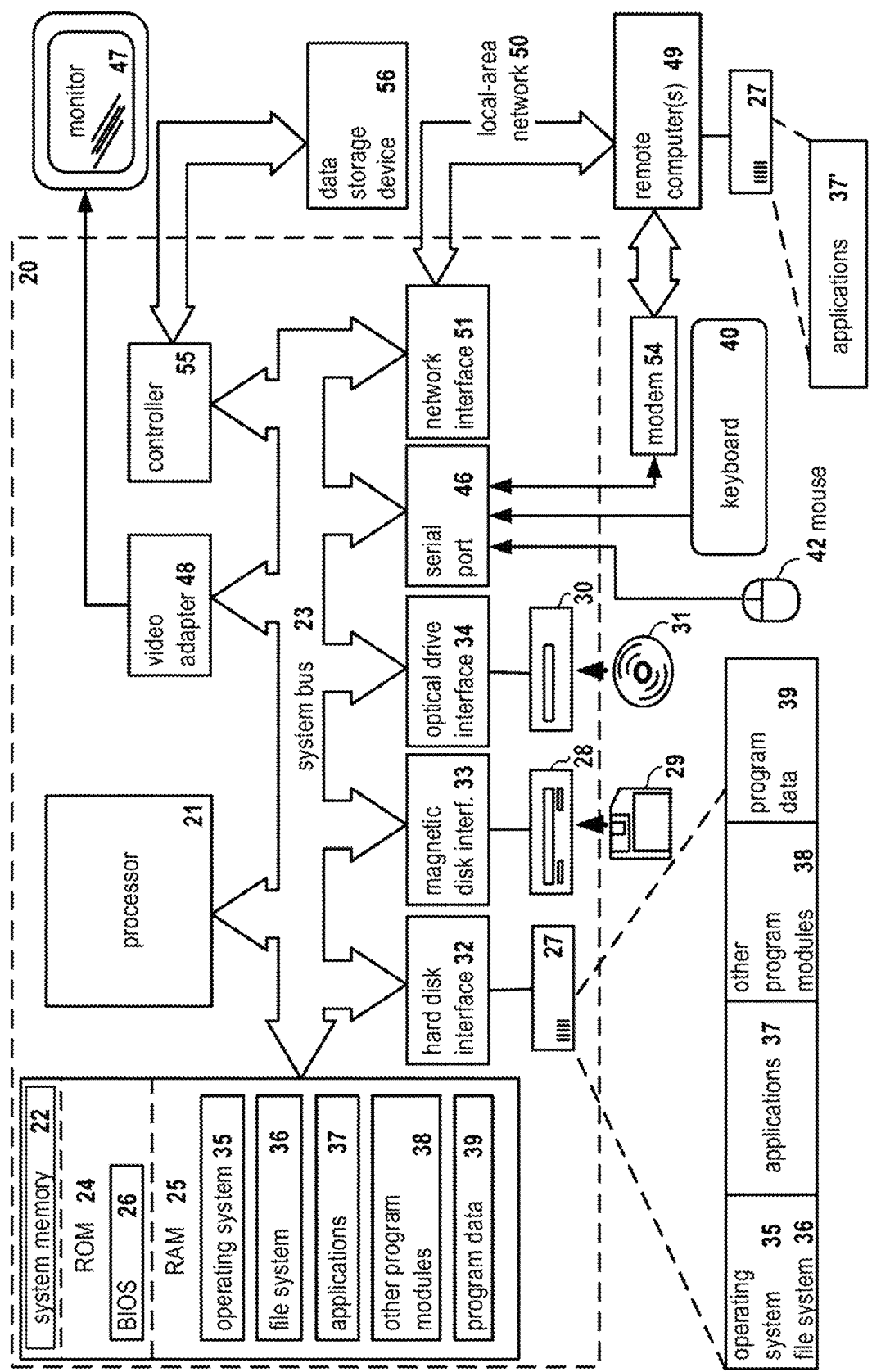
FIG. 8 represents an example of a general-purpose computer system which can be used to realize the present disclosure.

FIG. 8 is a diagram illustrating a general-purpose computer system on which aspects of systems and methods for automated design of hardware and software systems and complexes may be implemented in accordance with an exemplary aspect.

As shown, the computer system 20 (which may be a personal computer or a server) includes a central processing unit 21, a system memory 22 and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

The computer system 20 includes a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 8, supra). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for automated design of a system of hardware and software comprising:
   constructing, by a hardware processor, a model of use based on an architecture description of the system, wherein the model of use indicates a use of the system reflecting interests of an authorized user and a first plurality of system elements through which the indicated use of the system is realized;
   selecting, from a threat database comprising information about threats from a violator, a plurality of threats corresponding to the first plurality of system elements;
   constructing, by the hardware processor, a threat model based on a threat description, wherein the threat model indicates the plurality of threats and a second plurality of system elements by which the plurality of threats are realized;
   determining a use of the system reflecting interests of both the authorized user and the violator based on an intersection between the model of use and the threat model; and
   selecting a configuration of system elements for realizing the system based on the determined use, wherein the selection of the configuration comprises:
   in response to determining that the determined use reflects only the interests of the violator, selecting a configuration that limits the determined use,
   in response to determining that the determined use reflects the interests of both the violator and the authorized user and usages by the violator and the authorized user are realized in different ways, selecting a configuration that limits a method of realization of a threat associated with the violator,
   in response to determining that the determined use reflects the interests of both the violator and the authorized user and usages by the violator and the authorized user are realized in a similar way, selecting a configuration that limits a vector of action on the system being used to carry out a method of realization of a threat.

2. The method according to claim 1, wherein the model of use comprises system components and links between the system components, and interests of authorized users with respect to the system.

3. The method according to claim 2, wherein the model of use is a CAD model.

4. The method according to claim 2, wherein the model of use further comprises: a method of realization of the indicated use of the system by the first plurality of system elements.

5. The method according to claim 1, wherein the constructing the threat model comprises:
selecting known threats to system similar to the system being designed and based on the architecture description.

6. The method according to claim 5, wherein the threat model further comprises: methods of realization by the second plurality of system elements, and vectors of action on the system to carry out the methods of realization.

7. The method according to claim 1, wherein the determined use comprises one or more of: second kinds of use of the system reflecting interest of the violator and an authorized user, each having different realizations, third kinds of use of the system reflecting interest of the violator and the authorized user, each realizing the third kinds of use in similar ways.

8. The method according to claim 1, wherein the configuration comprises hardware and software configurations of the system.

9. The method according to claim 1, wherein the selection of the configuration comprises:
selecting a configuration that complies with requirements of functional safety.

10. The method according to claim 9, wherein elements of the architecture include one or more of:
cameras;
a protected channel between the authorized user and a web server; and
a zone in which the web server is located.

11. A system for automated design of a system of hardware and software comprising:
a hardware processor;
a model constructor configured to:
construct, by the hardware processor, a model of use based on an architecture description of the system, wherein the model of use indicates a use of the system reflecting interests of an authorized user and a first plurality of system elements through which the indicated use of the system is realized;
select, from a threat database comprising information about threats from a violator, by the hardware processor, a plurality of threats corresponding to the first plurality of system elements; and
construct, by the hardware processor, a threat model based on a threat description, wherein the threat model indicates the plurality of threats and a second plurality of system elements by which the plurality of threats are realized;
a comparator configured to:
determine, by the hardware processor, a use of the system reflecting interests of both the authorized user and the violator based on an intersection between the model of use and the threat model; and
an element selector configured to:
select, by the hardware processor, a configuration of system elements for realizing the system based on the determined use, wherein the selection of the configuration comprises:
in response to determining that the determined use reflects only the interests of the violator, selecting a configuration that limits the determined use,
in response to determining that the determined use reflects the interests of both the violator and the authorized user and usages by the violator and the authorized user are realized in different ways, selecting a configuration that limits a method of realization of a threat associated with the violator,
in response to determining that the determined use reflects the interests of both the violator and the authorized user and usages by the violator and the authorized user are realized in a similar way, selecting a configuration that limits a vector of action on the system being used to carry out a method of realization of a threat.

12. The system according to claim 11, wherein the model of use comprises system components and links between the system components, and interests of authorized users with respect to the system.

13. The system according to claim 12, wherein the model of use further comprises: a method of realization of the indicated use of the system by the first plurality of system elements.

14. The system according to claim 11, wherein the model constructor is further configured to:
select, by the hardware processor, known threats to systems similar to the system being designed and based on the architecture description.

15. The system according to claim 14, wherein the threat model further comprises: methods of realization by the second plurality of system elements, and vectors of action on the system to carry out the methods of realization.

16. The system according to claim 11, wherein the configuration comprises hardware and software configurations of the system wherein the selection of the configuration comprises:
selecting a configuration that complies with requirements of functional safety.

17. A non-transitory computer-readable medium storing therein computer executable instructions that when executed by a hardware processor, perform operations for automated design of a system of hardware and software, the operations comprising:
constructing, by the hardware processor, a model of use based on an architecture description of the system, wherein the model of use indicates a use of the system reflecting interests of an authorized user and a first plurality of system elements through which the indicated use of the system is realized;
selecting, from a threat database comprising information about threats from a violator, a plurality of threats corresponding to the first plurality of system elements;
constructing, by the hardware processor, a threat model based on a threat description, wherein the threat model indicates the plurality of threats and a second plurality of system elements by which the plurality of threats are realized;
determining a use of the system reflecting interests of both the authorized user and the violator based on an intersection between the model of use and the threat model; and
selecting a configuration of system elements for realizing the system based on the determined use, wherein the selection of the configuration comprises:
in response to determining that the determined use reflects only the interests of the violator, selecting a configuration that limits the determined use,
in response to determining that the determined use reflects the interests of both the violator and the authorized user and usages by the violator and the authorized user are realized in different ways, selecting a configuration that limits a method of realization of a threat associated with the violator, in response to determining that the determined use reflects the interests of both the violator and the authorized user and usages by the violator and the authorized user are realized in a similar way, selecting a configuration that limits a vector of action on the system being used to carry out a method of realization of a threat.

18. The non-transitory computer-readable medium according to claim 17, wherein the model of use comprises system components and links between the system components, and interests of authorized users with respect to the system.

19. The non-transitory computer-readable medium according to claim 18, wherein the model of use is a CAD model.

20. The non-transitory computer-readable medium according to claim 18, wherein the model of use further comprises: a method of realization of the indicated use of the system by the first plurality of system elements.

* * * * *